United States Patent
Gim et al.

(10) Patent No.: US 7,068,416 B2
(45) Date of Patent: Jun. 27, 2006

(54) THREE-DIMENSIONAL IMAGING DEVICE

(75) Inventors: Dong Woo Gim, Gyoungnam (KR); Cheong Soo Seo, Seoul (KR); Gyoung Il Cho, Seoul (KR); Tae Hyeon Kim, Taejeon (KR)

(73) Assignees: Angstrom Inc. (KR); Stereo Display Inc., Anaheim, CA (US)

( * ) Notice: Subject to any disclaimer, the term of this patent is extended or adjusted under 35 U.S.C. 154(b) by 0 days.

(21) Appl. No.: 10/822,414

(22) Filed: Apr. 12, 2004

(65) Prior Publication Data

US 2005/0225884 A1    Oct. 13, 2005

(51) Int. Cl.
G02B 26/00    (2006.01)
G02B 26/08    (2006.01)

(52) U.S. Cl. .................. 359/291; 359/290; 359/295; 359/298

(58) Field of Classification Search ............. 359/290, 359/291, 295, 298, 225, 226, 625, 626, 846, 359/721, 627; 345/6
See application file for complete search history.

(56) References Cited

U.S. PATENT DOCUMENTS

| 2,002,376 | A | 5/1935 | Manfred |
| 4,834,512 | A | 5/1989 | Austin |
| 5,986,811 | A | 11/1999 | Wohlstadter |
| 6,111,900 | A | 8/2000 | Suzudo |
| 6,658,208 | B1 | 12/2003 | Watanabe et al. |
| 6,833,938 | B1 | 12/2004 | Nishioka |
| 2002/0102102 | A1 | 8/2002 | Watanabe et al. |
| 2005/0057812 | A1 | 3/2005 | Raber |

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.
Cho, 2003, "Fast-response Variable Focusing Micromirror Array Lens," Proceeding of SPIE vol. 5055: 278-286.

*Primary Examiner*—Loha Ben
*Assistant Examiner*—Jack Dinh
(74) *Attorney, Agent, or Firm*—John K. Park; Park Law Firm

(57) ABSTRACT

A new three-dimensional imaging device has been needed to overcome the problems of the prior arts that the used variable focal length lenses that are still slow, have small focal length variation and low focusing efficiency, and requires a complex mechanism to control it. The invented three-dimensional imaging system uses the variable focal length micromirror array lens. Since the micromirror array lens has lots of advantages such as very fast response time, large focal length variation, high optical focusing efficiency, large size aperture, low cost, simple mechanism, and so on, the three-dimensional imaging device can get a real-time three-dimensional image with large depth range and high depth resolution.

4 Claims, 4 Drawing Sheets

THREE-DIMENSIONAL IMAGING DEVICE

BACKGROUND OF THE INVENTION

The present invention relates to a three-dimensional imaging device using a micromirror array lens.

Several three-dimensional imaging devices have been proposed and developed. One of them uses a "depth from focus" criterion and fast response variable focal length lens. It is described in T. Kaneko et al., 2000, "Quick Response Dynamic Focusing Lens using Multi-Layered Piezoelectric Bimorph Actuator," *Proceeding of SPIE* Vol. 4075: 24–31. This imaging system uses a variable focal length lens comprised of two thin glass diaphragms with a transparent working fluid and multi-layered piezoelectric bimorph actuator mounted thereon. To get a three-dimensional image, the criterion of "depth from focus" achieves an all-in-focus image and three-dimensional reconstruction, simultaneously. Since the variable focal length lens has a slow focal length change speed of 150 Hz, the system can have only 5 focal plane shifts when about 30 Hz is considered for the afterimage effect of the human eye. Besides, the lens has a small focal plane variation in the range of −4 mm to 4 mm, which limits the possible range of depth and the depth resolution of the three-dimensional image. A high speed, large variation of numerical aperture and large diameter of variable focal length lens is necessary to get a real-time, large range of depth and high depth resolution three-dimensional image.

A most widely used conventional variable focusing system is the one using two refractive lenses. It has a slow response time and complex driving mechanisms to control the relative position of the refractive lenses. Alternatively, variable focal length lenses have been made. Among them, a most advanced variable focal length lens is a liquid crystal variable focal length lens, which has a complex mechanism to control it. Its focal length is changed by modulating the refractive index. Unfortunately, it has a slow response time typically on the order of hundreds of milliseconds. Even though the fastest response liquid crystal lens has a response time of tens of milliseconds, it has a small focal length variation and a low focusing efficiency.

A new three-dimensional imaging device is needed to overcome the problems of the prior arts that used variable focal length lenses that are slow, have small focal length variation and low focusing efficiency, and/or have a complex control mechanism.

SUMMARY OF THE INVENTION

An objective of the invention is to provide a real-time three-dimensional imaging system that can get an all-in-focus image and depth information of the image.

Another objective of the invention is to provide a three-dimensional imaging system that can compensate various optical distortions or aberrations.

The present invention provides a real-time three-dimensional imaging device with a large depth range using a variable focal length micromirror array lens.

The three-dimensional imaging device generates an all-in-focus image and depth information of the image. The device includes a variable focal length lens, an imaging unit capturing images with different focal planes, which are changed by the variable focal length lens, and an image processing unit processing the images.

The variable focal length lens comprises a micromirror array lens.

The focal plane of the imaging device is changed by change of focal length of the micromirror array lens.

The imaging unit includes one or more two-dimensional image sensor taking an original two-dimensional image at each focal plane.

The image processing unit generates the all-in-focus image and the depth information for in-focus image from original two-dimensional images. All the processes are achieved within a unit time which is less than or equal to the afterimage time of the human eye.

The image sensor takes original two-dimensional images with different focal planes that are shifted by changing the focal length of the micromirror array lens. The image processing unit extracts in-focus pixels or areas from original pictures at different focal planes and generates an all-in-focus image. Three-dimensional information of the image can be obtained from the focal plane of each in-focus pixel. There are several methods for the image processing unit to obtain an all-in-focus image with depth information. Recent advances in both the image sensor and the image processing unit make them as fast as they are required to be.

The micromirror array lens includes a plurality of micromirrors. The translation and/or rotation of each micromirror of the micromirror array lens is controlled to change the focal length of the lens.

The micromirrors of the micromirror array lens are arranged to form one or more concentric circles.

Each micromirror of the micromirror array lens may have a fan shape.

The reflective surface of each micromirror of the micromirror array lens is substantially flat. Alternatively, the reflective surface of each micromirror of the micromirror array lens can have a curvature. The curvature of the micromirror can be controlled.

Preferably, the reflective surface of the micromirror is made of metal.

Each micromirror of the micromirror array lens is actuated by electrostatic force and/or electromagnetic force.

The micromirror array lens further includes a plurality of mechanical structures upholding the micromirrors and actuating components for actuating the micromirrors. The mechanical structures and the actuating components are located under the micromirrors.

The micromirror array lens is a reflective Fresnel lens, and the micromirrors are arranged in a flat plane. Each micromirror has the same function as a mirror. The array of micromirrors works as a reflective focusing lens by making all light scattered from one point of an object have the same periodical phase and converge at one point on the image plane. In order to do this, the micromirrors are electrostatically and/or electromagnetically controlled by actuating components to have desired positions. The focal length of the lens is changed by controlling its translation, by controlling its rotation, or by controlling both translation and rotation.

The three-dimensional imaging system includes a beam splitter positioned between the micromirror array lens and an image sensor. Alternatively, the micromirror array lens is positioned so that the path of the light reflected by the micromirror array lens is not blocked without using a beam splitter.

The micromirror array lens is an adaptive optical component. The micromirror array lens compensates for phase errors of light introduced by the medium between an object and its image and/or corrects the defects of the three-dimensional imaging system that may cause the image to deviate from the rules of paraxial imagery. Also, an object which does not lie on the optical axis can be imaged by the micromirror array lens without macroscopic mechanical movement of the three-dimensional imaging system.

In order to obtain a color image, the micromirror array lens is controlled to satisfy the same phase condition for each wavelength of Red, Green, and Blue (RGB), respectively. The three-dimensional imaging system may further include a plurality of bandpass filters for color imaging. Also, the three-dimensional imaging system may further include a photoelectric sensor. The photoelectric sensor includes Red, Green, and Blue (RGB) sensors. A color image is obtained by processing electrical signals from the Red, Green, and Blue (RGB) sensors according to an imaging processing method. The processing of electrical signals from the Red, Green and Blue (RGB) sensors is synchronized and/or matched with the control of the micromirror array lens to satisfy the same phase condition for each wavelength of Red, Green and Blue (RGB), respectively.

The micromirror array lens includes micromirrors and actuating components, and uses a very simple mechanism to control the focal length. The focal length of the micromirror array lens is changed with the translation and/or rotation of each micromirror.

The micromirror has a tiny mass. Therefore, the lens comprising the micromirror has a very fast response time down to hundreds of microseconds. The lens also has a large focal length variation and a high optical focusing efficiency. In addition, the lens design makes a large size lens possible, makes the focusing system very simple, and requires low power consumption. The lens has a low production cost because of the advantage of mass productivity. The lens can also compensate for optical effects introduced by the medium between the object and its image and/or corrects the defects of a lens system that cause the image to deviate from the rules of paraxial imagery.

The micromirror array lens can have a polar array of micromirrors. For the polar array, each micromirror has a fan shape to increase its effective reflective area so that the optical efficiency is increased. The aberration of the micromirror array lens can be reduced by micromirrors with curvatures. The optical efficiency of the micromirror array lens also can be increased by locating a mechanical structure upholding the micromirror and the actuating components under the micromirror to increase an effective reflective area and controlling the curvature of micromirrors.

The micromirror array lens used in the present invention has the following advantages: (1) the micromirror array lens has a very fast response time because each micromirror has a tiny mass; (2) the lens has a large focal length variation because large numerical aperture variations can be achieved by increasing the maximum rotational angle of the micromirror; (3) the lens has a high optical focusing efficiency; (4) the lens can have a large size aperture without losing optical performance. Because the micromirror array lens includes discrete micromirrors, the increase of the lens size does not enlarge the aberration caused by shape error of a lens; (5) the cost is inexpensive because of the advantage of mass productivity of microelectronics manufacturing technology; (6) the lens can compensate for phase errors introduced by the medium between the object and the image and/or corrects the defects of the lens system that cause its image to deviate from the rules of paraxial imagery; (7) the lens makes the focusing system much simpler; (8) the lens requires small power consumption when electrostatic actuation is used to control it.

The three-dimensional imaging system of the present invention has the following advantages: (1) the device can make a real-time three-dimensional image; (2) the device has a large range of depth; (3) the device has a high optical efficiency; (4) the device can have high depth resolution; (5) the cost is inexpensive because the micromirror array lens is inexpensive; (6) the device can compensate for phase errors introduced by the medium between the object and its image and/or correct the defects of a lens system that cause the image to deviate from the rules of paraxial imagery; (7) the device is very simple because there is no macroscopic mechanical displacement or deformation of the lens; (8) the device is compact; (9) the device requires small power consumption when the micromirror array lens is actuated by electrostatic force.

Although the present invention is briefly summarized herein, the full understanding of the invention can be obtained by the following drawings, detailed description, and appended claims.

DESCRIPTION OF THE FIGURES

These and other features, aspects and advantages of the present invention will become better understood with reference to the accompanying drawings, wherein.

DETAILED DESCRIPTION OF THE INVENTION

Figure 1:
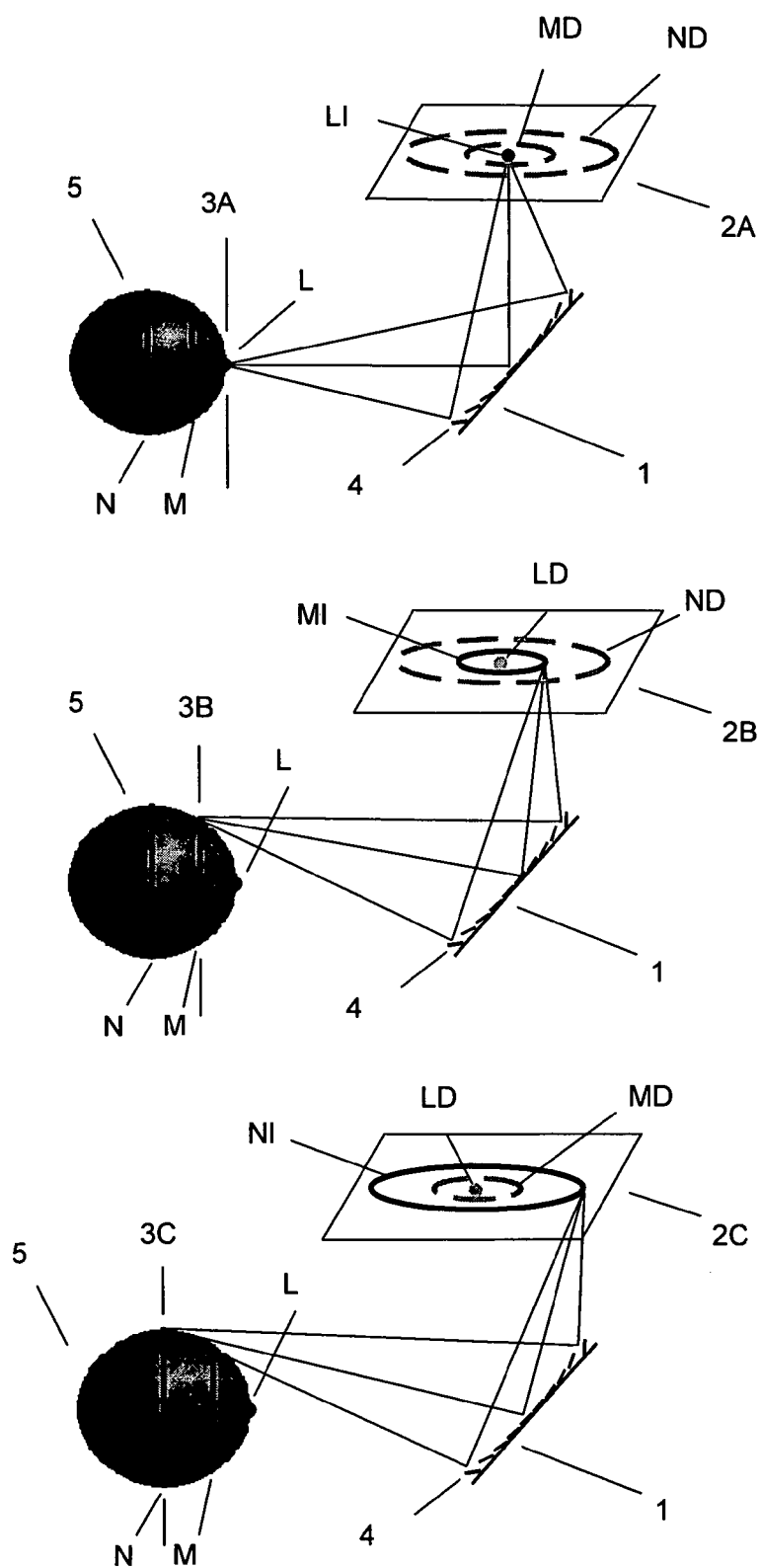
FIG. 1 is a schematic diagram showing how a three-dimensional image is obtained from original two-dimensional images with different focal planes, which are obtained by changing the focal length of a micromirror array lens.

FIG. 1 shows how a micromirror array lens 1 gets original two-dimensional images 2A, 2B, 2C with different focal planes 3A, 3B, 3C. The micromirror array lens 1 includes many micromirrors 4. The focal length of the micromirror array lens 1 is changed by electrostatically and/or electromagnetically controlling each of the micromirrors 4. A focal length change of the micromirror array lens 1 changes the focal plane of the imaging system. Two-dimensional original images 2A, 2B, 2C are taken with the depth information which is obtained from the position of the focal plane. The original two-dimensional image 2A with the first focal plane 3A has in-focus image LI which is the image of the portion L of an object 5. Images MD, ND of portion M, N of an object 5 are defocused. Therefore, the image processing unit determines the in-focus pixels LI from the original two-dimensional images 2A. The focal plane 3A of the first original two-dimensional image 2A gives the depth information of in-focus pixels LI. The original two-dimensional images 2B, 2C with the second and third focal plane 3B, 3C are processed in the same manner as the first focal plane to get in-focus images and depth information of in-focus images.

An example of a micromirror array lens is described in the paper entitled "Fast-response Variable Focusing Micromirror Array Lens" by James G. Boyd IV and Gyoungil Cho, which was published on Mar. 2, 2003. The paper is incorporated by reference into this disclosure as if fully set forth herein.

Figure 2:
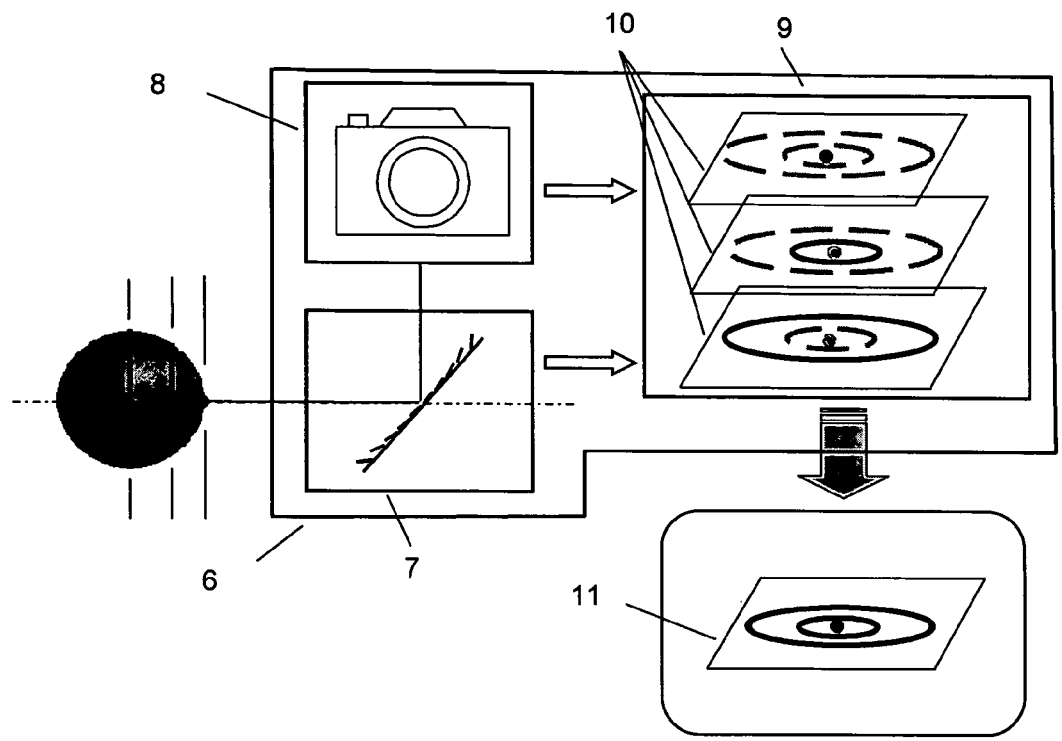
FIG. 2 is a schematic diagram showing a three-dimensional imaging device using the micromirror array lens.

FIG. 2 shows a three-dimensional imaging device 6, which takes an all-in-focus image 11 and depth information of the image. The device includes a variable focal length lens 7, an imaging unit 8 capturing images 10 with different focal planes which are changed by the variable focal length lens 7, and an image processing unit 9 processing the images 10.

The focal plane of the imaging device is changed by change of focal length of the micromirror array lens 7.

The imaging unit 8 includes one or more two-dimensional image sensor taking original two-dimensional images 10 with different focal planes.

The image processing unit 9 generates the all-in-focus image and the depth information for in-focus image from original two-dimensional images. All the processes are achieved within a unit time which is less than or equal to the afterimage time of the human eye.

When the micromirror array lens 7 changes the focal length according to the predetermined desired depths, the image sensor 8 takes original two-dimensional images 10 with the corresponding depth information. The desired number of depths is determined by the depth resolution and the range of depth of the object to be imaged. To get real-time three-dimensional video images, the desired focal planes are scanned within the unit time. Even though the unit time is not a serious problem for a still image, it must be less than the afterimage time of human eye for real-time three-dimensional video image. The necessary focal length change speed of the micromirror array lens is the desired number of focal planes times the afterimage speed of human eye. The necessary speed of the image processing is equal to or lager than the speed of micromirror array lens to do real-time three-dimensional imaging. There are several methods for the image processing to obtain all-in-focus image 11 and depth information for each pixel of the image.

Figure 3:
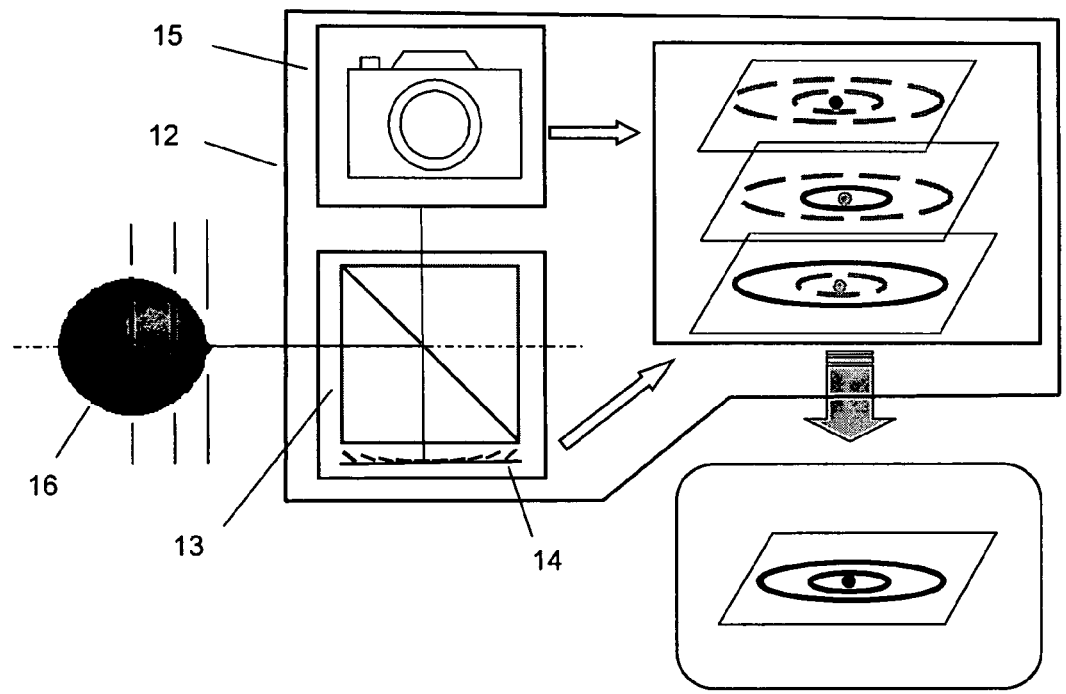
FIG. 3 is a schematic diagram showing the three-dimensional imaging device using a beam splitter and the micromirror array lens.

FIG. 3 shows an alternative arrangement in which the three-dimensional imaging device 12 further includes a beam splitter 13 positioned in the path of light between the micromirror array lens 14 and the image sensor 15. Since the micromirror array lens 14 is a reflective type, the device 12 cannot be aligned in a line. An optical arrangement in which the reflected light is not blocked by the object 16 is required. The beam splitter 13 changes the direction of the light by 90°, and thus the micromirror array lens is positioned orthogonal to the light path.

Alternatively, as shown in FIG. 2, the micromirror array lens 7 is positioned so that the path of the light reflected by the micromirror array lens 7 is not blocked without using a beam splitter.

Figure 4:
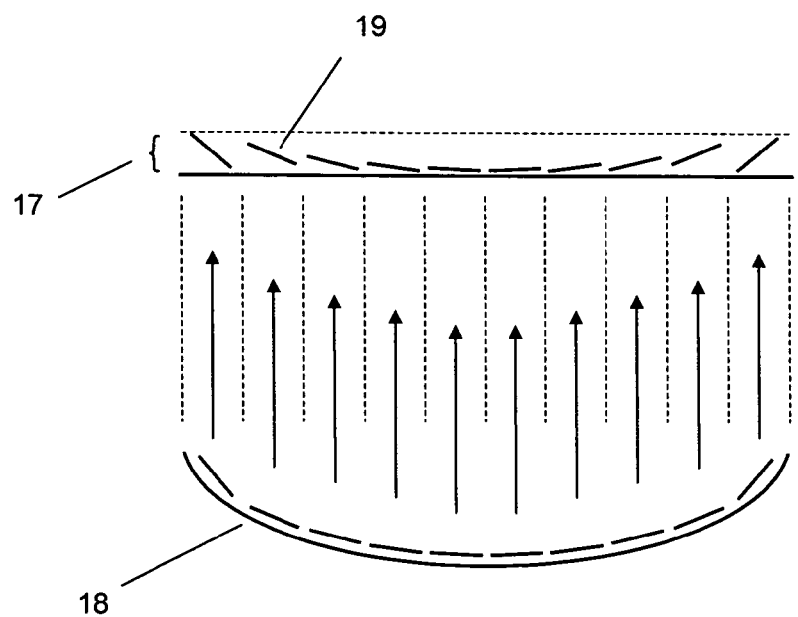
FIG. 4 shows the principle of the micromirror array lens.

FIG. 4 shows the principle of a micromirror array lens 17. There are two conditions for a perfect lens. The first is a converging condition that all light scattered by one point of an object should converge into one point of the image plane. The second is the same phase condition that all the converging light should have same phase at the image plane. To satisfy the perfect lens conditions, the surface shape of conventional reflective lens 18 is generated to have all light scattered from one point of an object to be converged into one point on the image plane and have the optical path length of all the converging light to be same. Even though the optical path length of the converging light is different, the same phase condition can be satisfied because a phase of light is periodic. Therefore, the surface shape of the conventional reflective lens 18 satisfying perfect lens conditions can be replaced by rotation and translation of micromirrors. Each micromirror 19 rotates to converge the scattered light and translates to adjust the phase.

Figure 5:
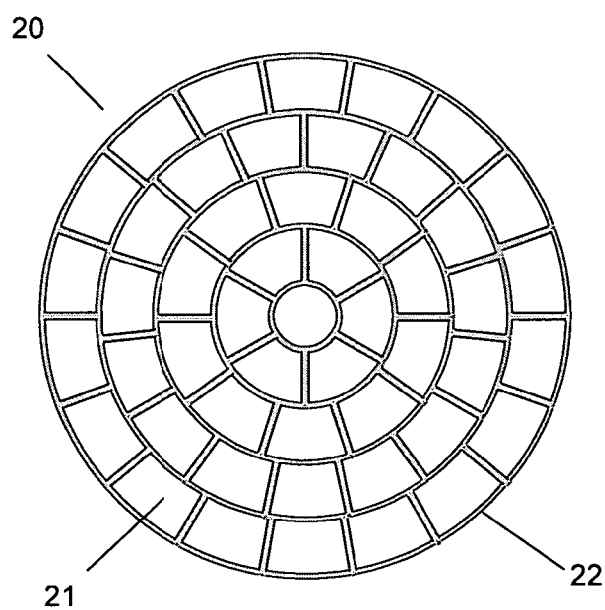
FIG. 5 is a schematic plan view showing the structure of the lens that is made of many micromirrors and actuating components.

FIG. 5 illustrates the two-dimensional view of a micromirror array lens 20. Each micromirror 21 of the micromirror array lens 20 is electrostatically and/or electromagnetically controlled by actuating components 22. Because a lens is axisymmetric, the micromirror array lens 20 can have a polar array of the micromirrors 21. Each of the micromirrors 21 can have a fan shape to increase an effective reflective area, which increases the optical efficiency.

The mechanical structures upholding each micromirror and the actuating components to rotate and translate the micromirrors 21 are located under the micromirrors 21 so that the micromirrors 21 are to be closer one another thereby increasing the effective reflective area.

Figure 6:
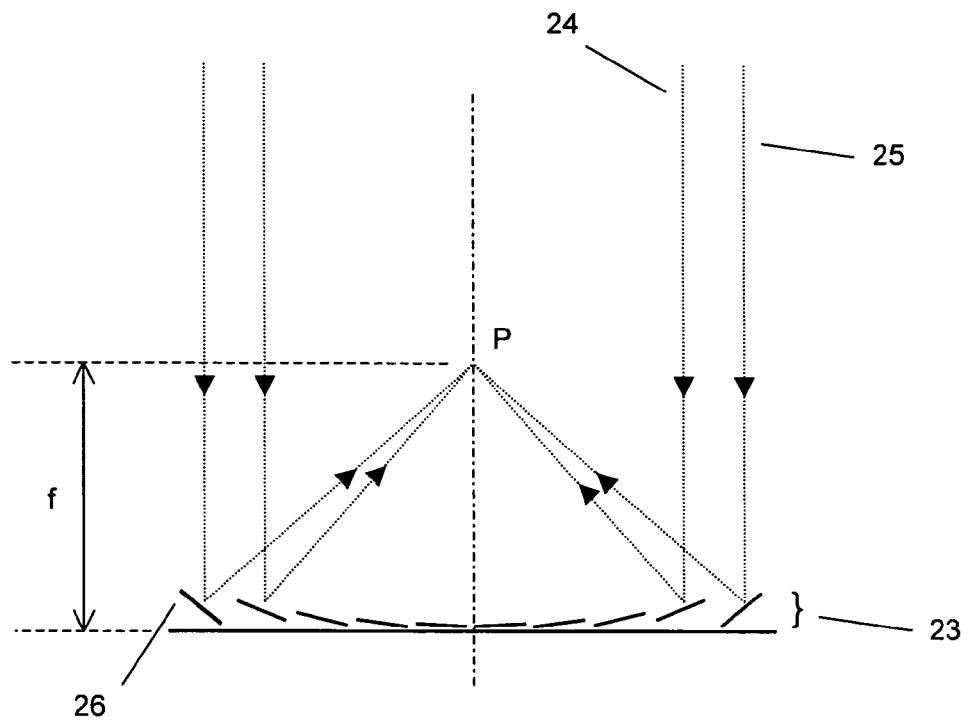
FIG. 6 is a schematic diagram showing how a micromirror array lens works as a lens.

FIG. 6 illustrates how the micromirror array lens 23 gets an image. Arbitrary scattered lights 24, 25 are converged into one point P on the image plane by controlling the position of each of the micromirrors 26. Phases of arbitrary lights 24, 25 can be adjusted to be the same by translating each of the micromirrors 26. The required translational displacement is at least half of the wavelength of light.

The focal length f of the micromirror array lens 23 is changed by controlling the rotation and/or translation of the micromirror 26. The operation of the micromirror array lens 23 is possible by controlling only rotation without controlling translation even though it can not satisfy the phase condition. In this case, the imaging quality of the lens 23 generated by controlling only rotation is degraded by the aberration. Pure translation without rotation can satisfy the two imaging conditions by Fresnel diffraction theory. The lens generated by the control of only translation has the aberration too. The smaller the sizes of the micromirrors 26 are, the less is the aberration. Even though the quality of the lens with one motion is lower than the lens with rotation and translation, the lens with one motion has the advantage that its control and fabrication is easier than the lens with both rotation and translation.

It is desired that each of the micromirrors 26 has a curvature because the ideal shape of a conventional reflective lens 18 has a curvature. However, since the aberration of the lens with flat micromirrors 26 is not much different from the lens with curvature if the size of each micromirror is small enough, there is not much need to control the curvature.

Figure 7:
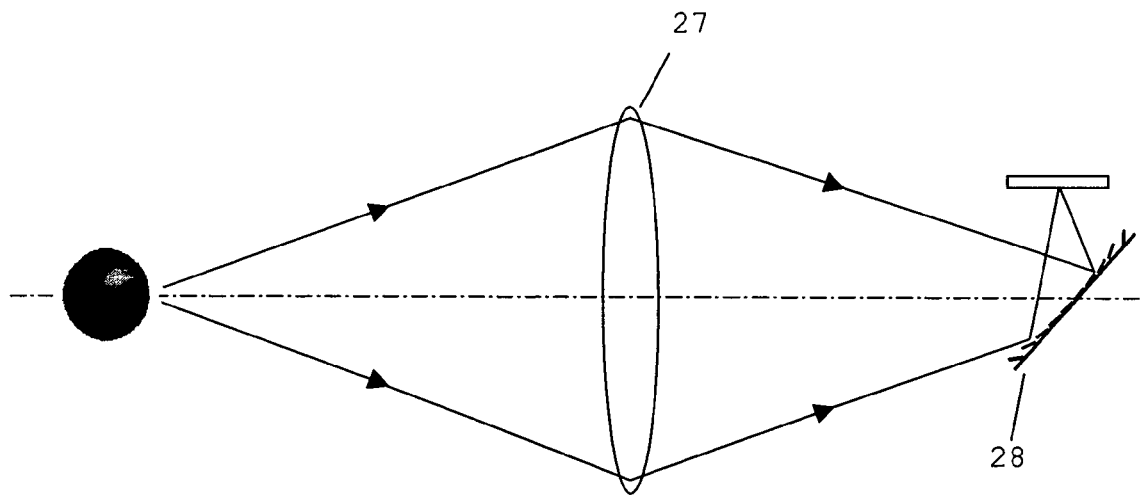
FIG. 7 is a schematic diagram showing the three-dimensional imaging device using an auxiliary lens.

FIG. 7 shows that an effective focal length and numerical aperture of the three-dimensional imaging device can be extended or changed by an auxiliary lens 27 having a predetermined focal length. An auxiliary lens 27 with large numerical aperture can increase numerical aperture of the three-dimensional imaging system. Also, the effective focal length of the three-dimensional imaging system can be changed to desired range by the auxiliary lens 27 and a micromirror array lens 28.

The micromirror array lens is an adaptive optical component because the phase of light can be changed by the translations and/or rotations of micromirrors. The micromirror array lens can correct the phase errors as an adaptive optical component can correct the phase errors of light introduced by the medium between the object and its image and/or corrects the defects of a lens system that cause its image to deviate from the rules of paraxial imagery. For an example, the micromirror array lens can correct the phase error caused by optical tilt by adjusting the translations and/or rotations of micromirrors. This allows magnification of any object within the Field of View without macroscopic mechanical motion of some portion of the optical system. Thus, the object to be magnified does not have to lie on the optical axis as in a conventional system.

The same phase condition satisfied by the micromirror array lens uses an assumption of monochromatic light. Therefore, to get a color image, the micromirror array lens of the three-dimensional imaging system is controlled to satisfy the same phase condition for each wavelength of Red, Green, and Blue (RGB), respectively, and the three-dimensional imaging system can use bandpass filters to make monochromatic lights with wavelength of Red, Green, and Blue (RGB).

If a color photoelectric sensor is used as an image sensor in the three-dimensional imaging system using a micromirror array lens, a color image can be obtained by processing electrical signals from Red, Green, and Blue (RGB) sensors with or without bandpass filters, which should be synchronized with the control of micromirror array lens.

To image the Red light scattered from an object, the micromirror array lens is controlled to satisfy the phase condition for the Red light and Red, Green, and Blue image sensors measure the intensity of each Red, Green, and Blue light scattered from an object. Among them, only the intensity of Red light is stored as image data because only Red light is imaged properly. To image each Green and Blue light, the micromirror array lens and each imaging sensor works in the same manner with the process of the Red light. Therefore, the micromirror array lens is synchronized with Red, Green, and Blue imaging sensors.

While the invention has been shown and described with reference to different embodiments thereof, it will be appreciated by those skills in the art that variations in form, detail, compositions and operation may be made without departing from the spirit and scope of the invention as defined by the accompanying claims.

The invention claimed is:

1. A three-dimensional imaging device comprising:
   a) a micromirror array lens;
   b) an imaging unit on which an image of the object at a given focal length of the micromirror array lens is formed; and
   c) an image processing unit processing the image on the imaging unit to produce a two-dimensional image at the given focal length;
   wherein the micromirror array lens is controlled to satisfy the same phase condition for each wavelength of Red, Green, and Blue (RGB), respectively, to get a color image.

2. The three-dimensional imaging device of claim 1, further comprising a plurality of bandpass filters.

3. The three-dimensional imaging device of claim 1, further comprising photoelectric sensors, wherein the photoelectric sensors comprises Red, Green, and Blue (RGB) sensors, wherein color images are obtained by treatments of electrical signals from the Red, Green, and Blue (RGB) sensors.

4. The three-dimensional imaging device of claim 3, wherein the treatment of electrical signals from the Red, Green and Blue (RGB) sensors is synchronized and/or matched with the control of the micromirror array lens to satisfy the same phase condition for each wavelength of Red, Green and Blue (RGB), respectively.

* * * * *